United States Patent
Riedl et al.

(10) Patent No.: US 7,503,503 B2
(45) Date of Patent: Mar. 17, 2009

(54) CARD LAMINATE

(75) Inventors: Josef Riedl, Attenkirchen (DE); Jürgen Jachmann, Fischbachau (DE)

(73) Assignee: Giesecke & Devrient GmbH, Munich (DE)

( * ) Notice: Subject to any disclaimer, the term of this patent is extended or adjusted under 35 U.S.C. 154(b) by 570 days.

(21) Appl. No.: 11/122,014

(22) Filed: May 5, 2005

(65) Prior Publication Data

US 2005/0247795 A1   Nov. 10, 2005

Related U.S. Application Data

(60) Provisional application No. 60/568,245, filed on May 6, 2004.

(51) Int. Cl.
*G06K 19/02* (2006.01)
(52) U.S. Cl. .................................................... 235/488
(58) Field of Classification Search ................. 235/488
See application file for complete search history.

(56) References Cited

U.S. PATENT DOCUMENTS

| | | | |
|---|---|---|---|
| 4,673,626 A * | 6/1987 | Takeda et al. | 430/14 |
| 4,684,795 A * | 8/1987 | Colgate, Jr. | 235/457 |
| 4,897,533 A | 1/1990 | Lyszczarz | |
| 6,471,128 B1 | 10/2002 | Corcoran et al. | |
| 6,491,782 B1 * | 12/2002 | Jaynes | 156/277 |
| 6,655,719 B1 * | 12/2003 | Curiel | 283/86 |
| 6,796,647 B2 * | 9/2004 | Kosaka et al. | 347/103 |

\* cited by examiner

*Primary Examiner*—Karl D Frech
*Assistant Examiner*—Tae W Kim
(74) *Attorney, Agent, or Firm*—Bacon & Thomas, PLLC

(57) ABSTRACT

A card laminate is produced from a centrally disposed foil laminate (1) consisting of an interior layer (2) with a metal layer (3) and with two exterior transparent plastic layers (4a, 4b), and two exterior plastic films (5a, 5b) of which at least the plastic film (5a) overlying the metal layer (3) is transparent and carries a print (6a). If the print (6a) is on the exterior, a transparent cover layer (7a) is furthermore provided. Materials and layer thicknesses are preferably selected symmetrically to the interior, metallized layer (2, 3) in order to reduce warping effects.

25 Claims, 1 Drawing Sheet

CARD LAMINATE

CROSS REFERENCE TO RELATED APPLICATION

This application claims the benefit of provisional application Ser. No. 60/568,245 filed May 6, 2004 under 35 U.S.C. 119(e).

BACKGROUND OF THE INVENTION

A. Field

This invention relates to a card laminate for card-shaped data carriers, in particular smart cards, magnetic strip cards, identity cards and the like, to a card-shaped data carrier produced therefrom, and to methods for production thereof.

B. Related Art

A card laminate for producing card-shaped data carriers consists as a rule of plastic films laminated together. Recesses for receiving electronic components, in particular a chip module, can be formed in the card layers before or after the laminating process. It is also known to embed single components or component groups integrated on card inlays between the card layers—possibly also without such recesses—during the laminating process. Furthermore, security features can be integrated in the laminate or applied to the laminate from outside, for example holograms, magnetic strips, security prints and the like. Special importance is also attached to high-quality printed images with an attractive appearance. It is known in this connection for example to provide outwardly visible layers of the card laminate with a metal layer, print the metal layer and then cover it with a transparent layer for protection against scratching and abrasion. The print against the metallic background has a particularly attractive effect.

Thus, U.S. Pat. No. 4,897,533 describes a credit card with a metal-coated PET film (polyester film) which is first glued to a PVC card core layer by the hot laminating method, then printed on the metal layer and finally protected against scratching by a transparent cover layer. To avoid damage to the printed metal layer upon application of the cover layer, the printed image is first applied to the metal layer by screen printing with a UV-crosslinking printing ink and then the cover layer applied either as a UV-curable varnish or as a polyester film glued on by hot-melt adhesive. The back side of the card core layer can be previously printed and covered with a laminated-on transparent PVC film.

U.S. Pat. No. 6,491,782 B1 describes a card laminate with a similar structure but wherein the card core is constructed of PVC in two layers, namely of a simple PVC film and a PVC-metal layer foil laminate which are each printed on the outer side before being joined together to form the card core. The thus formed card core is in turn covered with transparent cover layers to protect the printed images.

However, printing metallized foils is problematic and as a rule requires previous treatment of the metal areas to be printed with a primer. Such pretreatment is proposed for example in U.S. Pat. No. 6,471,128, making the metal layer suitable for printing both by screen printing and by offset printing. The introduction of the above-mentioned U.S. Pat. No. 6,491,782 B1 furthermore mentions that directly printing the metallized foil surface can be avoided if the foil is printed on the back, but this presupposes that the foil material is transparent.

Printing the metallized foil is problematic since the metallized foil is scratch-sensitive and can be damaged during processing, in particular if the metal coating must be provided with a primer before printing. Rejects due to misprints are likewise to be feared. However, all rejects must be avoided if possible because of the expensive metallized foils.

A further disadvantage of the stated prior art lies in the asymmetrical card layer structure relative to the central plane of the laminate. This can cause undesirable warping to occur during the cooling process after lamination or during later use of the card. A symmetrical structure of the previously described card laminates would involve so many layers, however, that production costs would be uneconomic and the usual ISO standard thickness of 0.76+/−0.08 mm hardly realizable.

The problem of the present invention is therefore to propose a card laminate for card-shaped data carriers and a corresponding card-shaped data carrier as well as methods for production thereof which have a print protected against scratching against a metallic background, the reject rate during production being as low as possible.

SUMMARY OF THE INVENTION

Accordingly, the card laminate comprises an interior layer provided with a metal layer partially or all over at least on one side, and a first plastic layer on each side of the interior layer. The first plastic layer overlying the metallized side is transparent so that the metal layer is recognizable from outside as an optically brilliant background for a printed image to be explained more closely hereinafter. The interior, metallized layer and the two adjacent plastic layers are provided as a foil laminate, which can preferably remain unprinted but which can also be printed. This has the advantage that the scratch-sensitive metal coating is mechanically protected against external influences by the two exterior first plastic layers. The foil laminate can therefore be safely produced, stored and processed further. The reject rate of the expensive metallized foil is accordingly low.

During further processing into the inventive card laminate, a further film is applied as a second plastic layer to the exterior sides of the two first plastic layers in each case, whereby at least the second plastic layer overlying the transparent first plastic layer is again transparent and furthermore printed at least on one side so that the printed image is visible against the metallic background.

This offers various advantages. On the one hand, it is thus possible to produce the printed image on standard films, for example made of PVC, by any printing method, in particular without the necessity of previously applying a primer. On the other hand, the central foil laminate and the film provided with the printed image can be produced in completely different places of production and only laminated into the inventive card laminate at a considerably later stage of the method. If the central foil laminate remains unprinted, no rejects due to misprints can thus occur. Rejects then only result in connection with the inexpensive PVC films.

Finally, the distance of the printed image from the metal layer makes it possible—due to the first plastic layer therebetween—to obtain three-dimensional effects or shadow effects against a background with metallic luster. If the printed image is located on the outer side of the second plastic layer, the distance from the metal layer is particularly great and the thus obtained 3D effect maximal.

According to a preferred embodiment, the transparent plastic film forming the second plastic layer is printed on both sides, so that two printed images are disposed in different planes spaced in front of the metal layer. This permits a special 3D effect to be obtained. Alternatively, the second printed image can also be printed on the outer side of the first transparent plastic layer of the central foil laminate, but this is less preferable because of the danger of rejects due to misprints on the expensive foil laminate. This rejects problem can be avoided, however, if the plastic layer of the central foil laminate is printed before it is laminated with the metallized foil to form the foil laminate.

If the second plastic layer is printed on the outer side, it is advantageous for protecting the printed image to provide the card laminate with a transparent cover layer over the printed image. Said transparent cover layer is provided according to one embodiment as a separate film and laminated together with the central foil laminate and the second plastic layers present as plastic films into the inventive card laminate. According to an alternative embodiment, the transparent cover layer can be applied to the second plastic layer in advance, for example as transparent lacquer or again as a film laminated on. In this case the second plastic layer is thus provided together with the cover layer as a laminate and laminated with the central foil laminate into the final card laminate.

The laminating process is done in the usual way by applying pressure and optionally temperature, whereby adhesive systems can be used between the layers to be laminated together. However, it is preferred to use a laminating method without additional adhesive layers wherein the layers to be laminated together fuse together solely by application of pressure and temperature due to their material properties. It is thus advantageous if the first plastic layers of the central foil laminate and the plastic films forming the adjacent, printed second plastic layers have approximately the same softening temperature. PVC is particularly suitable for example, since PVC is printed without problems. Instead of PVC one can also use PETG (glycolized polyethylene terephthalate), whereby one layer can also be of PETG and the other layer of PVC. The processing of PETG is very similar to that of PVC, with a Vicat softening temperature of approx. 70° C. for PETG and of 65 to 80° C. depending on the type of PVC.

The basic material of the interior metallized layer is preferably formed by a metallized PET film ("polyester film"; PET=polyethylene terephthalate) which is commercially available as standard. Said films are normally vacuum metallized. However, the metallized foil can also be a foil laminate comprising a polymeric carrier layer and a thin metal foil. The metal layer of the interior, metallized layer can be provided on one side or both sides, so that the above-described effects accordingly become visible either on only one or on both sides of the card to be produced from the card laminate.

The cover layer, if one is necessary, is again selected with a corresponding softening temperature, e.g. made of PVC, in particular when the connection with the other layers is not produced by an adhesion-promoting adhesive but solely by the application of pressure and temperature.

According to a development of the invention, at least one metallized area of the interior layer has a diffractively effective relief structure, which can be produced for example by an embossing method preferably before or optionally only after metallization. The relief structure can also extend all over the interior layer. This makes it possible to realize holographic effects and other diffractive effects—for example a rainbow effect—in the background of the printed image. Diffractively effective relief structures to be used are refraction patterns, holograms, but also lattice structures (e.g. Kinegrams®, Pixelgrams) or the like. The interior plastic layer can again be equipped with the metallized relief structure on one side or on both sides.

Apart from the above-mentioned advantages, the inventive card laminate can be designed to be dimensionally stable, that is, largely resistant to warping. This is obtained substantially by the arrangement of the foil laminate in the middle of the card laminate. An ideal structure is obtained if the thicknesses and the materials of the above-described layers of the card laminate are distributed symmetrically with respect to the interior, metallized layer.

DESCRIPTION OF THE DRAWINGS

The invention will hereinafter be described by way of example with reference to the accompanying drawings, in which.

DETAILED DESCRIPTION

Figure 1:
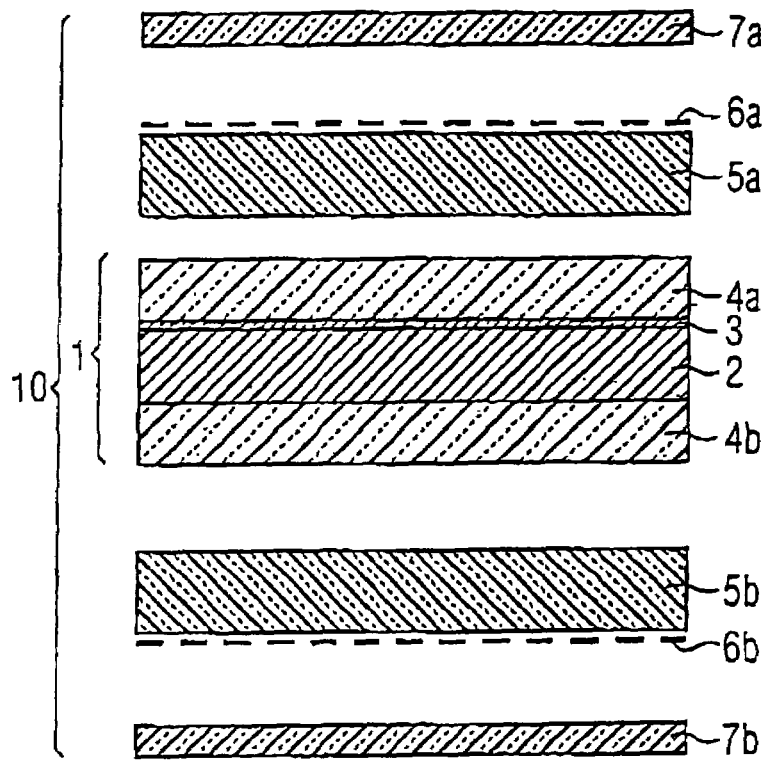
FIG. 1 shows schematically the layer structure of a card laminate according to a first embodiment of the invention.

FIG. 1 shows the layer arrangement of a card laminate schematically at a time before the layers are laminated together. The layers are laminated later into a uniform card laminate 10 by the application of pressure and temperature, here without the interposition of additional adhesive layers.

The layer structure comprises a central foil laminate 1 consisting of an interior plastic layer 2 made of polyester (PET) with two opposing sides and with a metal layer 3 on one of the opposing sides of the interior layer 2, and two transparent first plastic layers 4a, 4b made of PVC or PETG. Second plastic film layers 5a, 5b are laminated on each side of the two transparent plastic layers 4a, 4b, with at least the plastic film 5a being transparent so that the metal layer 3 is visible from outside through the plastic film 5a. Design prints 6a and 6b are applied to the exterior surfaces of the opposed sides of the plastic films 5a and 5b, respectively. The design print 6a is thus spaced in front of the metal layer 3. The design print 6a can alternatively be located on the side of the plastic film 5a facing the foil laminate 1, thereby making the distance from the metal layer 3 smaller. However, the greater the distance of the design print 6a is from the metal layer 3, the more striking a resulting 3D effect or shadow effect of the design print 6a is against the metallic background. The metal layer 3 can reflect in any color, in particular in silver or gold color. To obtain an intimate bond of the plastic layers 4a, 4b with the plastic films 5a, 5b without the use of adhesives, the plastic films 5a, 5b are made of PVC with a softening point corresponding approximately to the plastic layers 4a, 4b.

Transparent plastic layers 7a and 7b are provided on the outer sides of the card laminate 10. Said plastic layers 7a, 7b are again preferably made of PVC or another plastic that can be readily connected intimately with the other layers by the laminating method solely by application of pressure and temperature. The transparent plastic layers 7a, 7b have the purpose of protecting the design prints 6a, 6b from external influences. They can therefore be thin, with a thickness of e.g. 50 µm. They can be omitted if the design print 6a is located on the side of the plastic film 5a, 5b facing the foil laminate 1. For reasons of symmetry the plastic layers 7a and 7b should either be omitted on both sides or be provided on both sides to reduce the danger of the card laminate warping.

Figure 2:
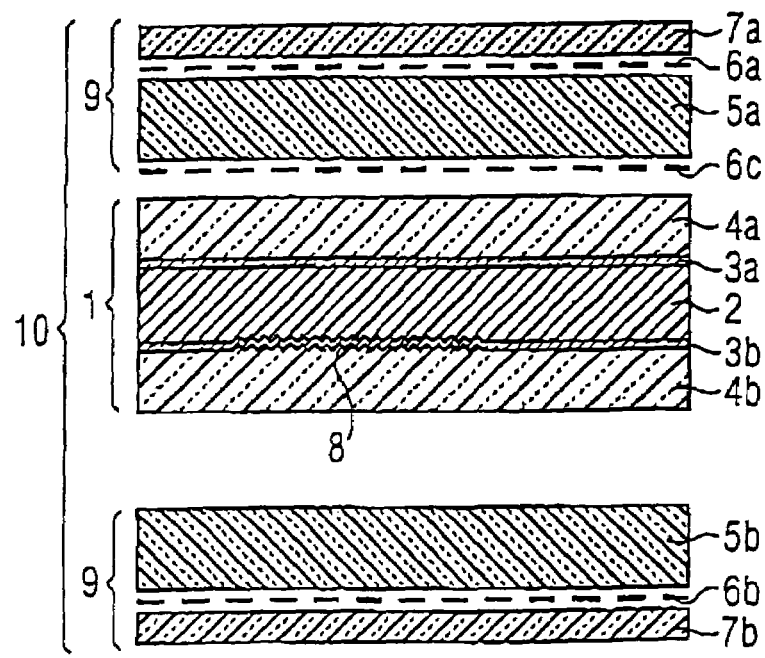
FIG. 2 shows schematically the layer structure of a card laminate according to a second embodiment of the invention.

FIG. 2 shows a further embodiment differing from the embodiment according to FIG. 1 in various respects. On the one hand, the transparent plastic films 5a and 5b form laminates 9 with the transparent plastic layers 7a, 7b, respectively. The transparent plastic layer 7a, 7b is in this case applied over the design print 6a, 6b as a transparent lacquer. However, it can also consist of a film which is glued on for example.

Furthermore, the transparent plastic film 5a is provided according to the embodiment shown in FIG. 2 on both sides with design prints 6a and 6c, so that the two design prints 6a, 6c result in a special 3D effect against a metallically reflecting background.

Finally, in the embodiment shown in FIG. 2 the interior plastic layer 2 is provided on both sides with metal layers 3a and 3b, the metal layer 3b having an embossed, diffractively effective relief structure 8 in a defined area. This makes it possible to realize holographic effects and in particular for example a rainbow effect, which form the background for the design print 6b here.

The two embodiments according to FIGS. 1 and 2 can be combined in any way by for example diffractively effective relief structures 8 being embossed on both sides of the interior plastic layer 2, and/or by the diffractively effective relief structure 8 serving as a background for the plastic film 5a printed on both sides. Furthermore, the metal layer 3 need not necessarily be present all over. For example, the metal layer 3b can be provided only in the area of the diffractively effective relief structure 8.

The described card laminate can be processed further into a card-shaped data carrier in any way. Normally the card laminate is first produced as roll material or in sheet form. The individual cards are then detached from the rolls and sheets, whereby the detaching process can be preceded and/or followed by further processing steps for producing the finished card. Such steps for processing the card laminate are commonly known to the expert.

The embodiments have been described with reference to plastic layers. However, the inventive idea is also applicable if polymer layers are used instead of plastic layers.

The invention claimed is:

1. A card laminate for card-shaped data carriers, as exemplified by smart cards, magnetic strip cards, and identity cards, comprising:
    an interior layer having two opposing sides, and being provided with a metal layer partially or all over at least on one of the two opposing sides of the interior layer,
    two separate first plastic layers, each of which is disposed on a different one of the two opposing sides of the interior layer, wherein at least a first one of the first plastic layers overlies the metal layer on one of the two opposing sides of the interior layer and is transparent, and
    two separate second plastic layers, each of which is disposed on a different one of two exterior sides facing out from the two first plastic layers, wherein at least a first one of the second plastic layers overlies the first one of the first plastic layers, is transparent and has a printed image at least on one of its two opposing sides.

2. The card laminate according to claim 1, including a transparent cover layer over the first one of the second plastic layers.

3. The card laminate according to claim 2, wherein the recited layers including the cover layer are laminated together.

4. The card laminate according to claim 2, wherein the cover layer is a transparent lacquer layer.

5. The card laminate according to claim 1, wherein thicknesses and materials of the recited layers are distributed symmetrically with respect to the interior layer and its associated metal layer or layers.

6. The card laminate according to claim 1, wherein the interior layer comprises a thermoplastic.

7. The card laminate according to claim 1, wherein the first one of the first plastic layers comprises a thermoplastic.

8. The card laminate according to claim 1, wherein the first one of the second plastic layers comprises a thermoplastic.

9. The card laminate according to claim 1, wherein the first one of the second plastic layers has printed images on both sides.

10. The card laminate according to claim 1, wherein the first one of the first plastic layers also has a printed image.

11. The card laminate according to claim 1, wherein at least one area of the interior layer has a diffractively effective relief structure.

12. A card-shaped data carrier comprising, a card body comprising a card laminate according to claim 1.

13. A method for producing a card laminate for card-shaped data carriers as exemplified by smart cards, magnetic strip cards, and identity cards, comprising the steps of:
    providing a foil laminate having an interior layer having two opposing sides provided with a metal layer partially or all over at least on one of the two opposing sides of the interior layer, and providing two separate plastic layers having exterior sides, each of the two separate plastic layers is disposed on a different one of the two opposing sides of the interior layer, wherein at least a first one of the plastic layers overlies the metal layer on one of the two opposing sides of the interior layer and is transparent,
    disposing two separate plastic films on the foil laminate such that each of the two plastic films is disposed on a different one of two exterior sides facing out from the plastic layers, wherein at least a first one of the plastic films overlies the first one of the plastic layers, is transparent and has a printed image at least on one of its two opposing sides, and
    laminating the foil laminate with the two plastic films.

14. The method according to claim 13, comprising the further step of providing a transparent cover layer over the first one of the two plastic films.

15. The method according to claim 14, wherein the first one of the two plastic films is provided during the disposing step as a laminate with the cover layer.

16. The method according to claim 14, wherein the cover layer is provided as a separate film, the cover layer being connected with the first one of the two plastic films by the laminating step.

17. The method according to claim 13, comprising further step of selecting thicknesses and materials of the stated layers and films such that they are distributed symmetrically with respect to the interior layer.

18. The method according to claim 13, wherein the interior layer comprises PET.

19. The method according to claim 13, wherein the first one of the first plastic layers of the foil laminate comprises a thermoplastic.

20. The method according to claim 13, wherein the first one of the plastic films comprises thermoplastic.

21. The method according to claim 13, wherein the first one of the plastic films is provided with printed images on both sides before the laminating step.

22. The method according to claim 13, wherein the first one of the plastic layers is provided with a printed image.

23. The method according to claim 13, wherein at least one area of the interior layer has a diffractively effective relief structure.

24. A method for producing a card-shaped data carrier, as exemplified by smart card, magnetic strip card, and identity card, comprising the steps of the method according to claim 13 and step of detaching a card body for the card-shaped data carrier from the card laminate.

25. The method according to claim 24, including either or both before and after the detaching step, further production steps of either or both integrating and applying other elements either or both in and on the card body.

* * * * *